United States Patent [19]

Kim

[11] Patent Number: 5,150,240
[45] Date of Patent: Sep. 22, 1992

[54] THIN FILM ACTIVE MATRIX CIRCUIT

[75] Inventor: Jeong J. Kim, Seoul, Rep. of Korea

[73] Assignee: Goldstar Co., Ltd., Seoul, Rep. of Korea

[21] Appl. No.: 443,209

[22] Filed: Nov. 30, 1989

[30] Foreign Application Priority Data

Nov. 30, 1988 [KR] Rep. of Korea ............. 15942/1988

[51] Int. Cl.$^5$ ............................................. G02F 1/133
[52] U.S. Cl. ................................................. 359/87
[58] Field of Search ............................. 350/333–336; 359/87, 88, 89, 54

[56] References Cited

U.S. PATENT DOCUMENTS

| | | | |
|---|---|---|---|
| 4,582,395 | 4/1986 | Morozumi et al. | 350/333 |
| 4,678,282 | 7/1987 | Yaniv et al. | 350/334 |
| 4,704,559 | 11/1987 | Suginoya et al. | 350/334 |
| 4,705,358 | 11/1987 | Yamazaki et al. | 350/334 |
| 4,770,498 | 9/1988 | Aoki et al. | 350/334 |
| 4,773,737 | 9/1988 | Yokono et al. | 350/339 F |
| 4,834,507 | 5/1989 | Kato et al. | 350/339 F |
| 4,920,409 | 4/1990 | Yamagishi | 350/333 |
| 4,950,058 | 8/1990 | Diem et al. | 350/333 |
| 4,965,565 | 10/1990 | Noguchi | 350/333 |

FOREIGN PATENT DOCUMENTS

| | | | |
|---|---|---|---|
| 0045219 | 3/1985 | Japan | 357/334 |
| 0056626 | 3/1988 | Japan | 350/334 |

*Primary Examiner*—Rolf Hille
*Assistant Examiner*—S. V. Clark

[57] ABSTRACT

A thin film active matrix circuit for use in a TFT-LCD color television set for simplifying the signal drive unit, enlarging the effective area of a screen, and maintaining the uniformity of the picture quality by connecting source bus lines to thin film display members of pixels corresponding to one kind of color so that the pixels can be maintained in the shape of a regular tetragon.

4 Claims, 1 Drawing Sheet

THIN FILM ACTIVE MATRIX CIRCUIT

BACKGROUND OF THE PRESENT INVENTION

1. Field of the Present Invention

The present invention relates to a thin film transistor-liquid crystal display (hereinafter "TFT-LCD") color television set, and more particularly, to a thin film matrix circuit for improving the picture quality and simplifying the structure of an image signal drive unit.

2. Description of the Prior Art

As shown in FIG. 1, a conventional thin film active matrix circuits utilized for an LCD drive unit are known in the prior art. For example, such thin film active matrix circuit includes gate bus lines 7 arranged in the transverse direction to supply scanning signals for actuating drains 3 connected to respective pixels 2 such as red R, green G, and blue B so as to perform the polarization; source bus lines 8 arranged below the gate bus lines 7; and a part of each pixel 2 cut out to accommodate a gate 4, a source 5 and a drain 3 of a thin film transistor 1 so that the pixels of two kinds of colors from red R, green G, and blue B can be controlled.

In such conventional thin film active matrix, when the transistor is turned on or off by scanning signals applied through the gate bus lines 7, the voltage is selectively applied to the pixels 2 through contacting portions 6 of the drain/pixel, and thus the LCDs are selectively polarized. At this time, the light on the rear side of an LCD panel passes through the pixels 2 in which the LCDs are polarized so that the image signals with respect to red R, green G and blue B corresponding to the respective pixels 2 are reproduced on the screen.

However, since one of the source bus lines 8 is connected to the sources 5 of the thin film transistors 1 which regulate the pixels of two kinds of colors and image signals of two kinds of colors are carried on one source bus line 8, the structure of the signal drive unit is complicating. Furthermore, in manufacturing of the thin film transistor 1 which is the LCD drive unit of each of the pixels 2, since the source bus lines 8 cross the gate bus lines 7, the area of the pixels 2 is decreased and therefore the effective region of the screen is decreased. Also, since each pixel 2 is of a step shape, the gaps between adjacent pixels 2 in the longitudinal direction are not uniform thereby the uniformity of the picture quality cannot be obtained.

SUMMARY OF THE INVENTION

Accordingly, it is an object of the present invention to provide an improved TFT-LCD color television set.

Another object of the present invention is to provide a thin film active matrix circuit for use in a TFT-LCD color television set for simplifying the signal drive unit, enlarging the effective area of a screen, and maintaining the uniformity of the picture quality by connecting source bus lines to thin film display members of pixels corresponding to one color so that the pixels can be maintained in the shape of a regular tetragon.

A further object of the present invention is to provide a TFT-LCD color television set which includes gate protrusion electrodes formed by extending gate bus lines in a longitudinal direction, arranged in a transverse direction, and adapted to supply scanning signals; source protrusion electrodes formed by extending the source bus lines in a transverse direction on which image signals are carried and arranged in the longitudinal direction for selecting pixels of one color; drain protrusion electrodes protruded opposite to the source protrusion electrodes in the transverse direction; and pixel electrodes for each color in the shape of a regular tetragon by arranging the horizontal portions of the source bus lines in symmetry with contacting portions of drain/pixel electrodes.

Other objects and further scope of applicability of the present invention will become apparent from the detailed description given below. It should be understood, however, that the detailed description and specific examples, while indicating preferred embodiments of the present invention, are given by way of illustration only, since various changes and modifications within the spirit and scope of the present invention will become apparent to those skilled in the art from this detailed description.

Briefly described, the present invention relates to a thin film active matrix circuit for use in a TFT-LCD color television set for simplifying the signal drive unit, enlarging the effective area of a screen, and maintaining the uniformity of the picture quality by connecting source bus lines to thin film display members of pixels corresponding to one color so that the pixels can be maintained in the shape of a regular tetragon.

BRIEF DESCRIPTION OF THE DRAWINGS

The present invention will become more fully understood from the detailed description given below and the accompanying drawings which are given by way of illustration only, and thus are not limitative of the present invention, and wherein.

DESCRIPTION OF THE PREFERRED EMBODIMENTS

Figure 1:
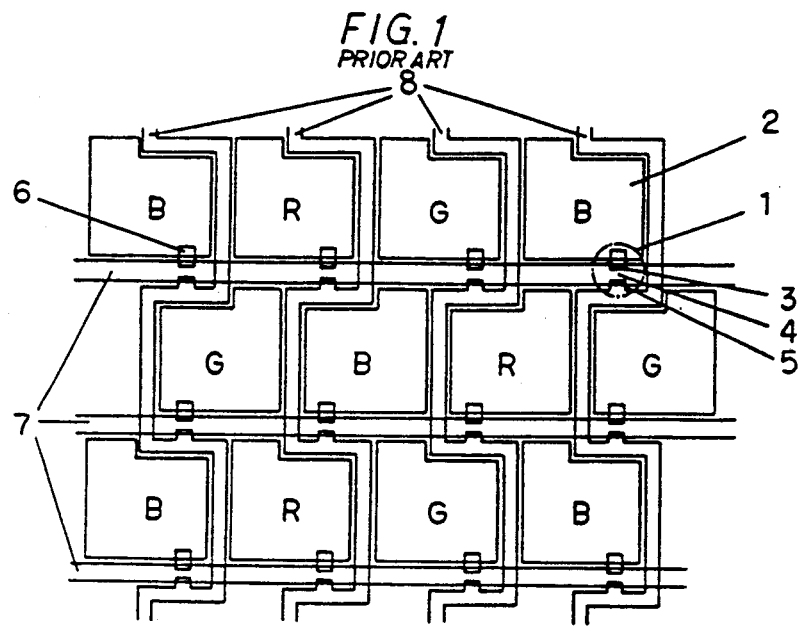
FIG. 1 illustrates a conventional thin film active matrix circuit.
Figure 2:
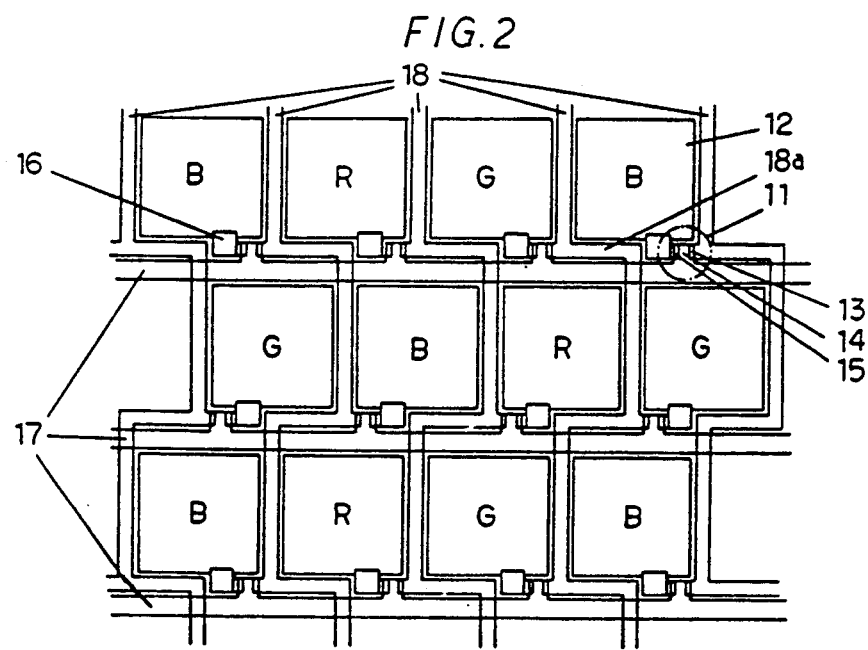
FIG. 2 illustrates a thin film active matrix circuit according to the present invention.

Referring now in detail to the drawings for the purpose of illustrating preferred embodiments of the present invention, the thin film active matrix circuit as shown in FIG. 2 comprises a thin film transistor 11 including a gate protrusion electrode 14 formed by extending in the longitudinal direction gate bus line 17 and arranged in the transverse direction to supply scanning signals, a source protrusion electrode 13 formed by extending in the transverse direction on which image signals are carried so as to select only a pixel 12 from of the pixels for red R, green G and blue B, and a drain protrusion electrode 15 disposed in the transverse direction opposite to the source protrusion electrode 13. The thin film active matrix circuit further comprises a horizontal portion 18a of a source bus line 18 located over the gate bus line 17 in parallel with a contacting portion 16 of a drain/pixel so that the pixel electrode 12 is maintained in the shape of a regular tetragon.

Figure 3:
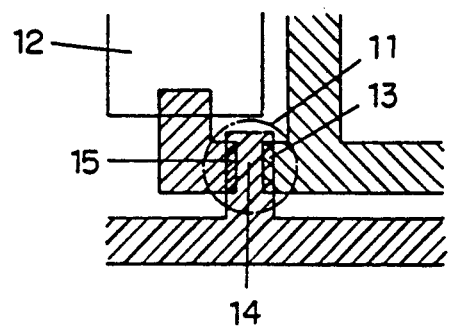
FIG. 3 is an enlarged sectional view of basic portion of an electrode of the thin film active matrix circuit according to the present invention.

FIG. 3 shows in detail the gate protrusion electrode 14, the drain protrusion electrode 15, and the source protrusion electrode 13 of the thin film active matrix circuit according to the present invention.

According to the present invention the thin film active matrix circuit operates as follows:

When the thin film transistor 11 is turned on or off by scanning signals applied to the gate protrusion electrode 14 through the gate bus line 17, the voltage is selectively applied to the pixels 12 through the contacting portions 16 of the drain/pixel electrode, thereby selectively polarizing the liquid crystals. At this time, the light from the rear side of an LCD panel passes through the pixel 12, wherein LCD of the pixel 12 are polarized, and then image signals of red R, green G, and blue B corresponding to the respective pixel 12 are reproduced through the screen.

In these arrangements, since the source bus line 18 is connected to the source protrusion electrode 13 of the thin film transistor 11 so as to regulate only one pixel 12 corresponding to one color from a number of pixels 12 for red R, green G, and blue B, one image signal corresponding to one color is carried on the source bus line 18, thereby the processing of image signal and scanning signal is simplified.

Furthermore, since the pixel 12 are of a regular tetragon shape, the gap between pixels 12 is maintained uniform, thereby the uniformity of picture quality is obtained and the effective area of screen can be substantially enlarged.

The present invention being thus described, it will be obvious that the same may be varied in many ways. Such variations are not to be regarded as a departure from the spirit and scope of the present invention, and all such modifications as would be obvious to one skilled in the art are intended to be included in the scope of the following claims.

WHAT IS CLAIMED IS:

1. A thin film active matrix circuit for use in a thin film transistor-liquid crystal display color television set comprising:
    a plurality of thin film transistors;
    said plurality of thin film transistors each including,
        a drain protrusion electrode,
        a source protrusion electrode formed by extending a source bus line in a direction perpendicular to said source bus line and opposite to said drain protrusion electrode, and
        a gate protrusion electrode formed by extending a gate bus line in a direction perpendicular to said gate bus line and perpendicular to said source protrusion electrode for connecting said drain protrusion electrode and said source protrusion electrode; and
    a plurality of pixels, operatively connected to said plurality of thin film transistor;
        said pixels each being connected to said drain protrusion electrode at a lower portion thereof;
        said pixels being formed in a shape of a regular tetragon and a horizontal portion of said source bus line being extended in a direction opposite to said source protrusion electrode, thereby improving picture quality.

2. The thin film active matrix circuit as claimed in claim 1, wherein said source protrusion electrodes of a single source bus line is connected only to pixels having a same color, wherein each pixel connected to a single source bus line is the same color.

3. A color image-forming apparatus, comprising:
    a plurality of color pixels;
    a plurality of source bus lines, each single source bus line being connected only to pixels having a same color, wherein each pixel connected to a single source bus line is the same color; and
    a plurality of gate bus lines;
    said plurality of gate bus lines each having a plurality of gate protrusion electrodes extending perpendicular therefrom;
    said plurality of source bus lines each having a plurality of source protrusion electrodes extending perpendicular therefrom;
    said plurality of source protrusion electrodes being perpendicular to said plurality of gate protrusion electrodes.

4. The apparatus as claimed in claim 3 wherein said color pixels are a regular tetragonal shape.

* * * * *